United States Patent [19]

Blanford et al.

[11] Patent Number: 5,138,141
[45] Date of Patent: Aug. 11, 1992

[54] METHOD AND APPARATUS FOR REPEATING THE OUTPUT OF AN OPTICAL SCANNER

[75] Inventors: Denis M. Blanford; Donald A. Collins, Jr.; Barry M. Mergenthaler, all of Cambridge, Ohio

[73] Assignee: NCR Corporation, Dayton, Ohio

[21] Appl. No.: 280,047

[22] Filed: Dec. 5, 1988

[51] Int. Cl.5 .................. G06K 7/10; G01V 9/04; G06M 7/00; H01J 40/14
[52] U.S. Cl. .................. 235/462; 250/221; 250/227.22
[58] Field of Search ........... 235/462, 464, 454; 250/221, 227.22; 364/405

[56] References Cited

U.S. PATENT DOCUMENTS

| | | | |
|---|---|---|---|
| 2,432,527 | 12/1947 | Lang | 250/221 |
| 2,729,288 | 1/1956 | Malott | 250/221 |
| 3,056,030 | 9/1962 | Kelchner | 250/221 |
| 3,372,789 | 3/1968 | Thiele et al. | 250/221 |
| 3,526,775 | 9/1970 | Friedrich et al. | 250/221 |
| 3,621,268 | 11/1971 | Friedrich et al. | 250/221 |
| 3,886,544 | 5/1975 | Narodny | 340/365 P |
| 3,937,952 | 2/1976 | Ripley et al. | 250/227 |
| 4,006,343 | 2/1977 | Izura et al. | 235/61.11 E |
| 4,049,964 | 9/1977 | Wuchinich et al. | 250/221 |
| 4,086,476 | 4/1978 | King | 235/462 |
| 4,240,064 | 12/1980 | DevChoudhury | 340/146.3 |
| 4,323,888 | 4/1982 | Cole | 340/365 A |
| 4,330,702 | 5/1982 | Cheng | 219/501 |
| 4,431,912 | 2/1984 | Dickson et al. | 235/466 |
| 4,525,799 | 6/1985 | Okawa et al. | 364/900 |
| 4,534,668 | 8/1985 | Hildel et al. | 400/477 |
| 4,575,623 | 3/1986 | Cononi et al. | 235/454 |
| 4,639,606 | 1/1987 | Boles et al. | 250/555 |
| 4,789,775 | 12/1988 | McClain et al. | 235/462 |
| 4,814,600 | 3/1989 | Bergström | 250/227.22 |

FOREIGN PATENT DOCUMENTS 57-043272 3/1982 Japan.

OTHER PUBLICATIONS

IBM Technical Disclosure Bulletin, vol. 20, No. 4 (Sep. 1977).

Primary Examiner—Stuart S. Levy
Assistant Examiner—Christopher R. Glembocki
Attorney, Agent, or Firm—Richard W. Lavin

[57] ABSTRACT

There is disclosed a method and apparatus for enabling a checkout system to repeat the price of a previously processed purchased merchandise item which includes mounting a pair of photodetector members in a pair of apertures located in the checkout counter which is exposed to ambient light and enabling the photodetector members to generate a pair of control signals in response to positioning a finger of the checkout operator over one of the apertures and alternately covering and uncovering the second aperture with a second finger of the checkout operator.

4 Claims, 3 Drawing Sheets

METHOD AND APPARATUS FOR REPEATING THE OUTPUT OF AN OPTICAL SCANNER

BACKGROUND OF THE INVENTION

The present invention relates to checkout systems and more particularly to a checkout counter having means mounted therein for repeating the reading of a coded label attached to a merchandise item during a checkout operation. In order to increase the speed of the checkout operation, optical scanning devices have been incorporated into checkout counters for reading data encoded indicia on labels affixed to the purchased merchandise items. Movement of the merchandise items across the scanning device results in the scanning device reading the encoded indicia labels. Where a number of the same merchandise items are being checked out, each merchandise item has to be moved across the scanning device in order to insert the merchandise item identification code into the processing system enabling the processing system to generate the price of the item. It has been found that this type of checkout procedure represents a significant portion of the total time it takes to check out the purchases of a customer.

SUMMARY OF THE INVENTION

This invention relates to a method and apparatus for repeating the generation of the output data of an optical scanner generated as a result of a scanning operation of a merchandise item without requiring the merchandise item to be moved across the scanning apparatus. In accordance with one embodiment of the invention, there is provided a merchandise checkout counter which includes a window portion located in the top surface of the counter through which scanning light beams are projected from a scanning mechanism mounted within the counter. The light beams scan a bar code label attached to a merchandise item as the merchandise item moves across the window portion. Mounted adjacent the window portion in the top surface to the counter are a pair of photodiodes, each located within apertures in the top surface of the counter and orientated in a vertical direction for receiving ambient light from a light source located above the checkout counter. Circuit means coupled to each of the photodiodes generate digital signals representing the presence or absence of a blocking element such as a finger of the checkout operator positioned adjacent the apertures. By covering one of the apertures with one finger and intermittently covering the other aperture with another finger, the checkout operator can control a microprocessor associated with the checkout system to repeat the price of the previously scanned merchandise item, thus increasing the speed of the checkout operation where a number of the same merchandise items have been purchased.

It is accordingly an object of the present invention to provide a method for increasing the speed of a merchandise checkout operation.

Another object of the present invention is to provide a method for increasing the speed of the checkout operation by enabling the checkout operator to repeat the output of an optical scanner while allowing the operator to move the purchased merchandise items across an optical scanning device.

BRIEF DESCRIPTION OF THE DRAWINGS

These and other objects, features and advantages of the invention, as well as the invention itself, will become more apparent to those skilled in the art in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
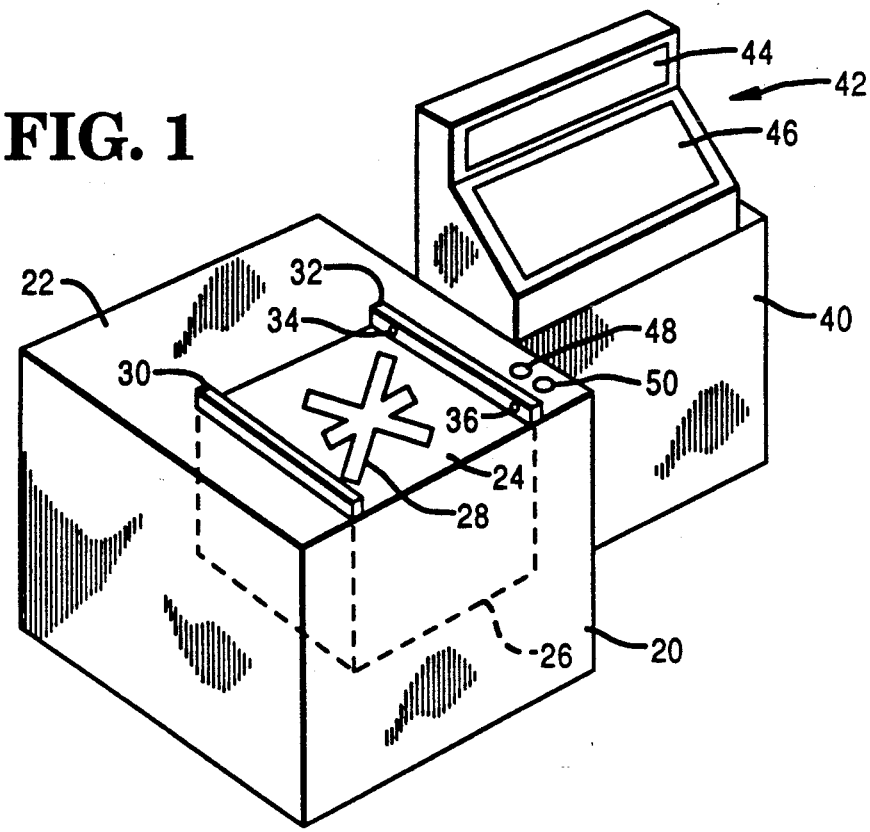
FIG. 1 is a perspective view of a checkout system in which the present invention is incorporated.

Referring now to FIG. 1, there is shown a perspective view of a checkout system which includes a checkout counter 20 having a top surface 22 on which are positioned the purchased merchandise items of a customer. Located at one end of the top surface 22 is the top surface plate 24 of an optical bar code reader 26 mounted within the counter 20. Located in the top plate 24 of the bar code reader 26 is a star-shaped window 28 through which scanning light beams from the reader are projected to scan a bar code pattern on a label attached to a purchased merchandise item moving across the window 28. Located adjacent the top plate 24 are a pair of upstanding rail members 30, 32 in which are mounted photodiodes 35, 37 (FIG. 3) and photodetectors 34, 36 (FIGS. 1 and 3) comprising item gates for sensing the presence or absence of a merchandise item on the top surface plate 24 for use in controlling the operation of the bar code reader 26. Mounted adjacent the counter 20 is a support member 40 on which is located a data terminal device generally indicated by the numeral 42 which includes a display portion 44 and a keyboard portion 46. As is well known in the art, coded data generated by the bar code reader 26 in reading a coded label attached to the purchased merchandise item is used to look up, in a price look-up table in a remote processor, the price of the merchandise item being scanned. This information is then transmitted to the display portion 44 enabling the operator and the customer to observe the price of the merchandise item being processed and then stored in a microprocessor 56 (FIG. 2) in the bar code reader 26. If additional information is to be inserted into the terminal, the keyboard portion 46 is utilized for this purpose. Located adjacent the rail member 32 in the top surface 22 of the counter 20 are a pair of apertures 48, 50 which are used in the present invention in a manner to be described more fully hereinafter.

Figure 4:
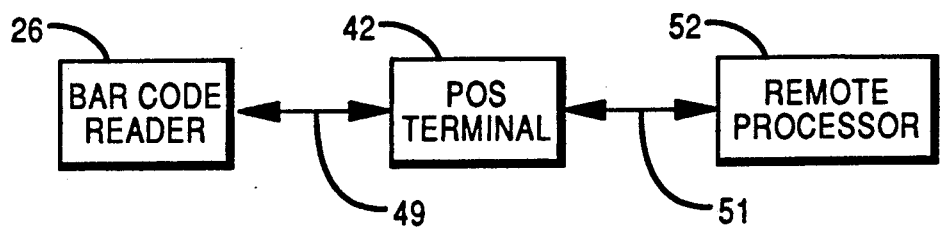
FIG. 4 is a block diagram of the checkout system which utilizes the present invention.

Referring now to FIG. 4, there is shown a block diagram of the checkout system which includes the bar code reader 26 coupled over a communication link 49 to the point of sale (POS) data terminal device 42 which in turn is coupled over a communication link 51 to a remote processor 52 in which are located the price look-up tables (not shown) from which the price of the merchandise item being processed is recovered utilizing the encoded data read from the coded label on the scanned merchandise item. The numerical data representing the price of the purchased merchandise items is then transmitted from the processor 52 and over the communication link 51 to the terminal device 42, which prints the price on a receipt and displays the price on the display portion 44, and then to the microprocessor 56 (FIG. 2) in the bar code reader 26.

Figure 2:
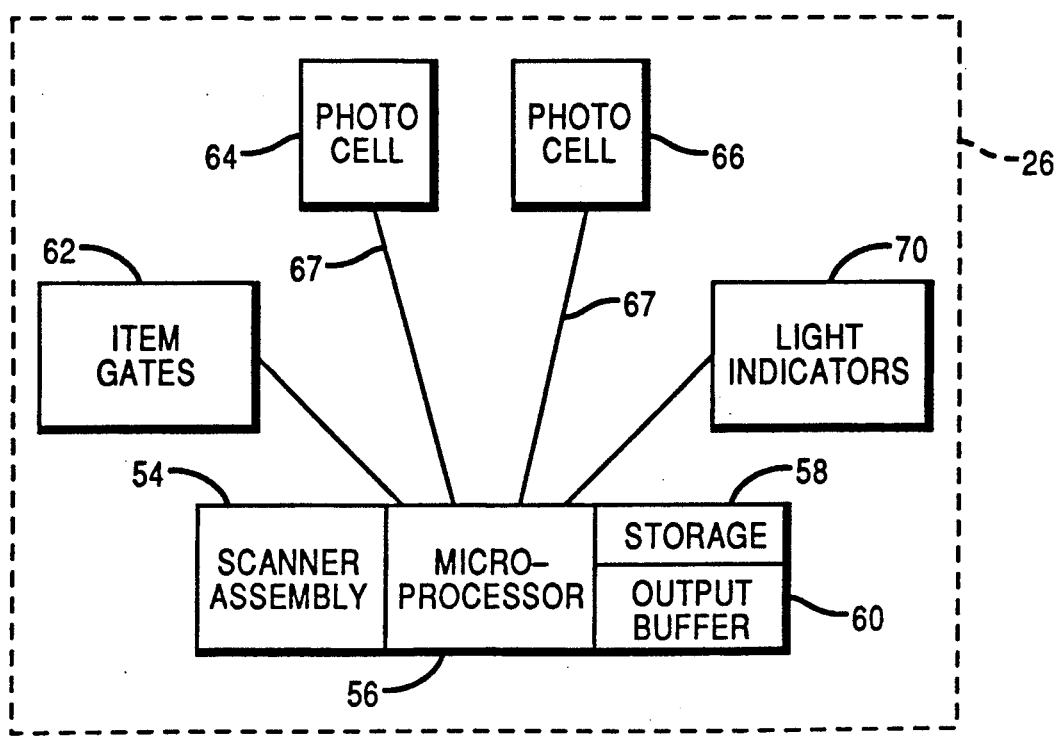
FIG. 2 is a schematic diagram of the bar code reader which includes the photodiodes and the microprocessor.

Referring now to FIG. 2, there is shown a block diagram of the bar code reader 26. The reader includes a scanner assembly 54, a microprocessor 56 for checking and decoding the encoded data read by the scanner assembly 54, a conventional memory storage unit 58, an output buffer 60 utilized for transmitting the data read by the scanner assembly 54 over the communication link 49 to a processor unit (not shown) in the POS terminal unit 42 (FIGS. 1 and 4), an item gate unit 62 which includes an upstream 32 (FIG. 1) and a downstream 36 item gate for detecting the presence or absence of a merchandise item on the top plate 24 of the bar code reader 26 for controlling the operation of the bar code reader, a pair of photocells 64, 66 used to control the microprocessor in processing the encoded data read from the purchased merchandise item in a manner that will be described more fully hereinafter and light indicators 70.

Figure 3:
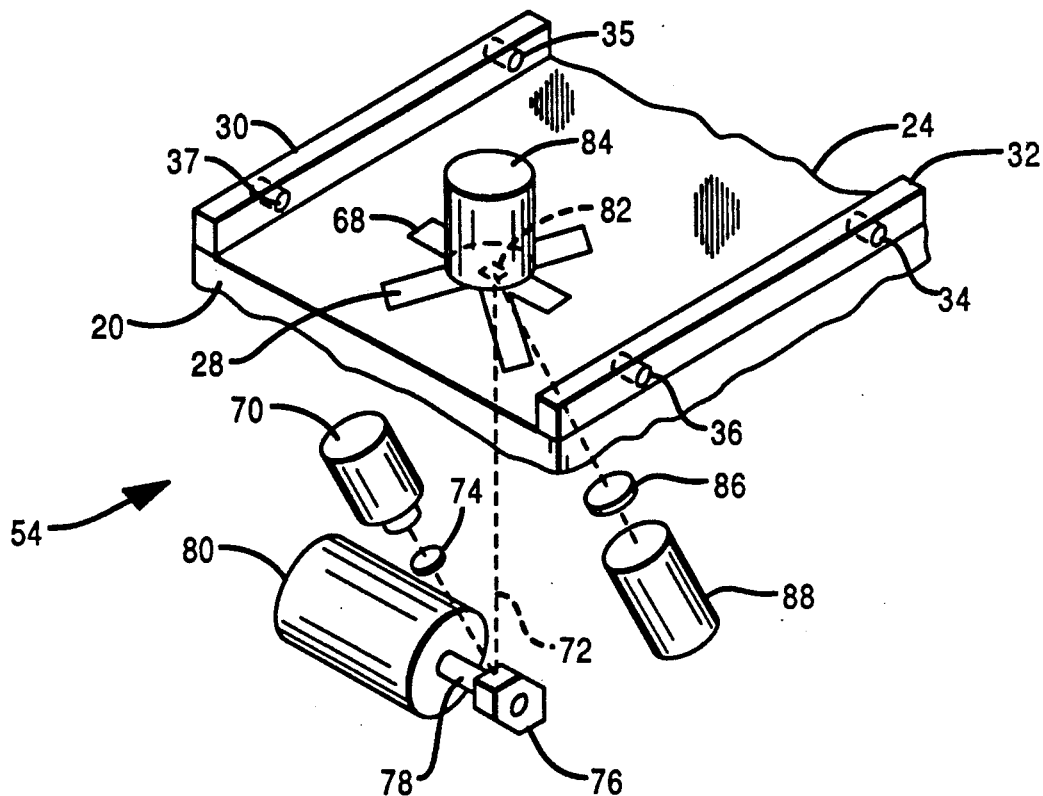
FIG. 3 is a fragmentary perspective view of the mechanical elements of a bar code reader.

Referring now to FIG. 3, there is shown a perspective view of the mechanical structure of the scanner assembly 54 (FIG. 2) which includes a light source 70 emitting an optical light beam 72 in the visible or near visible spectrum, the light beam 72 being focused by a lens system 74 onto a multi-faceted mirror 76. The mirror 76 is secured to the shaft 78 of a motor 80 which rotates the mirror 76 at a substantially constant speed. The rotating mirror 76 projects the light beam 72 through the window 28 located in the top surface plate 24 of the bar code reader to scan the encoded indicia on a label 82 attached to a purchased merchandise item 84 positioned adjacent the window 28. The rotation of the mirror 76 results in a succession of light beams 72 forming a scanning pattern which scans the encoded label 82 in a manner that is well known in the art.

The scanning light beams 72 are reflected off the label 82 through an optical filter 86 to a photo-responsive detector device such as a photo-multiplier 88 which converts the reflected light beams into electrical signals, the amplitude of which corresponds to the amount of light received. The electrical signals are then converted to digital signals and transmitted to the microprocessor 56 (FIG. 2) which processes the encoded data, transmits the data through the output buffer 60 to the terminal device 42 (FIG. 4) which in turn transmits the data to the remote processor 52 where the data is used by the processor to look up in lookup tables the price of the purchased merchandise item. The microprocessor 56 will also decode and check the encoded data received from the multiplier 88 to determine if the data is valid or not and will then generate control signals indicating whether the scanning operation produced a good or bad read. The microprocessor 56 will transmit such signals to the light indicators 70 (FIG. 2) which are operated to indicate to the operator of the terminal device whether a good or bad read operation was obtained. If a bad read operation is indicated, the operator will then repeat the movement of the purchased merchandise item across the window 28.

For a more detailed description of the bar code reader 26 and the construction of the bar code which is read, reference may be had to the following United States Patents, which are assigned to the assignee of the present application: U.S. Pat. No. 4,086,476, issued Apr. 25, 1978; U.S. Pat. No. 4,253,018, issued Feb. 24, 1981; U.S. Pat. No. 4,272,675, issued Jun. 9, 1981; U.S. Pat. No. 4,275,380 issued Jun. 23, 1981; U.S. Pat. No. 4,282,426 issued Aug. 4, 1981; U.S. Pat. No. 4,287,507 issued Sept. 1, 1981; and U.S. Pat. No. 4,679,154 issued Jul. 7, 1987.

Figure 5:
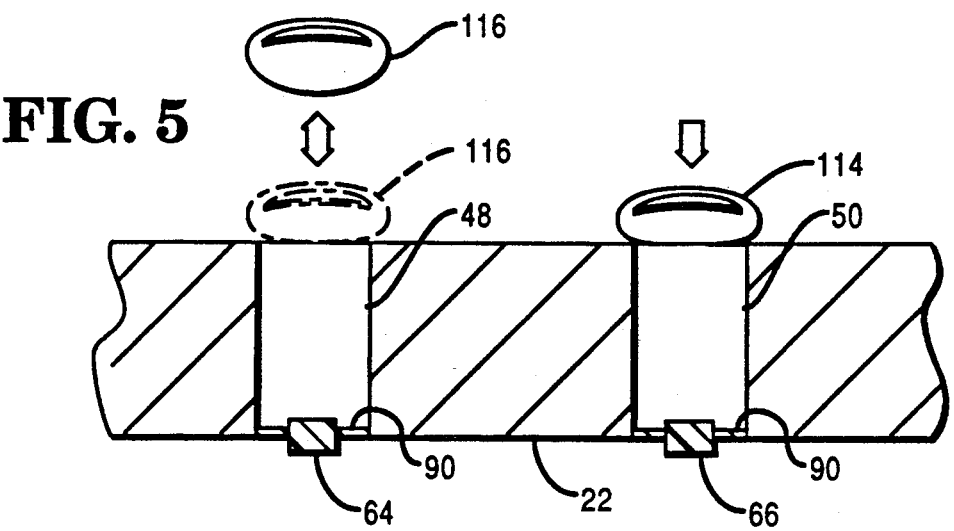
FIG. 5 is a partial side sectional view of the apertures located in the top surface of the checkout counter.
Figure 6:
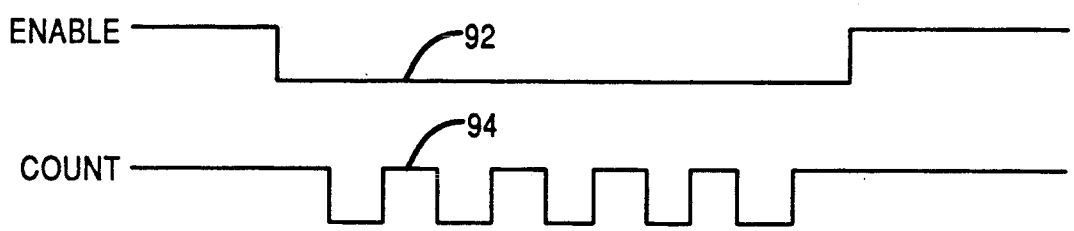
FIG. 6 illustrates waveforms useful in explaining the operation of the present invention.

Referring now to FIG. 5, there is shown a partial side sectional view of the top surface 22 of the checkout counter 20 (FIG. 1) which includes the apertures 48 and 50. Each of the apertures 48 and 50 extend through the top surface 22 of the checkout counter and includes a floor member 90 in which is mounted one of the photocells 64 and 66 (FIG. 2) which may comprise silicon photodiodes. When the apertures 48 and 50 are uncovered, the ambient light from a light source such as a fluorescent lamp striking the silicon photodiodes results in the generation of electrical signals having a first value. When the apertures 48 and 50 are covered, the reduction in the intensity level of the light striking the silicon photodiodes located in the apertures 48 and 50 results in the generation of electrical signals having a second value. In the present invention, the operator will cover the aperture 50 with a finger 114 resulting in the photodiode 66 generating an enable signal 92 (FIG. 6) which is transmitted to the microprocessor 56. As each succeeding purchased merchandise item being processed is found to be the same, the operator will use another finger such as the forefinger 116 to intermittently cover and uncover the aperture 48 thereby producing a series of count signals 94 in accordance with the number of merchandise items processed. The occurrence of each of the count signals 94 during the time the enable signal 92 is generated results in the microprocessor 56 repeating the price of the first merchandise item scanned. It will be seen that this operation can be performed with one hand while leaving the other hand of the operator free to place the purchased merchandise items in a proper receptacle. This operation also eliminates a large portion of the checkout procedure thus shortening the checkout operation.

Figure 7:
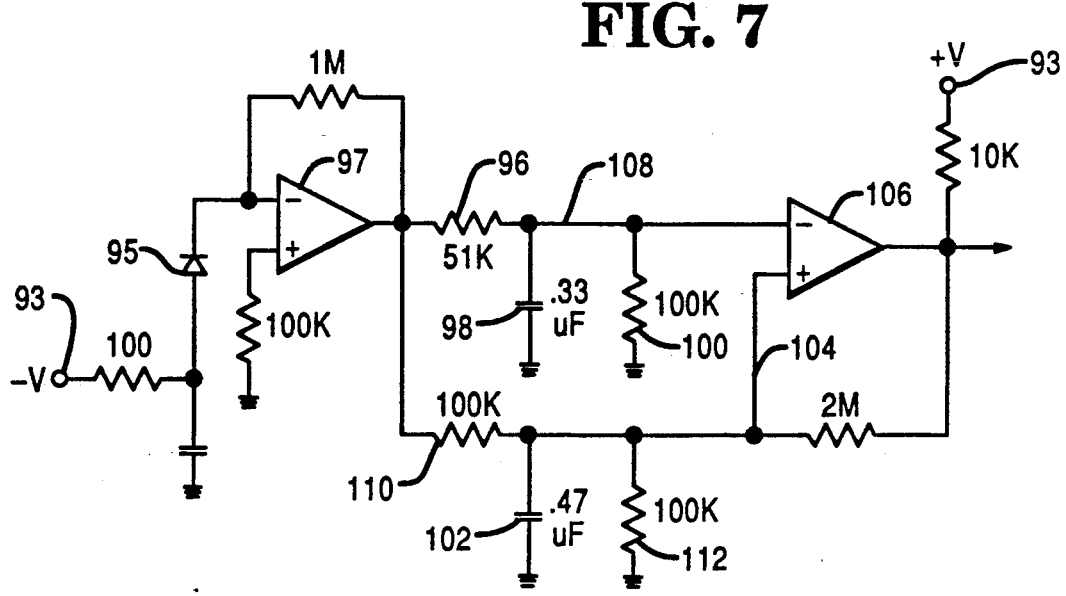
FIG. 7 is a schematic diagram of the circuit enabling the silicon photodiodes to generate digital signals in accordance with the light level striking the photodiodes.

Referring now to FIG. 7, there is disclosed a schematic diagram of the control circuit associated with the photodiodes 64, 66 which will convert a change in the light level striking the silicon photodiodes 64 and 66 to digital signals which can be used to control the microprocessor 56 to repeat the price look-up operation of the previously processed merchandise item. The diode 95, which may be either of the photodiodes 64 or 66, produces an electrical current from a voltage source 93 in proportion to the amount of light striking its active element in a manner that is well known in the art. This current is converted by the amplifier 97 into a voltage signal which is applied across timing elements comprising resistors 96 and 110 and capacitors 98 and 102. The RC time constants are chosen so that the resistor 110 and capacitor 102 track long term changes in the order of ten seconds and apply said changes as a reference voltage level over line 104 to the positive input of the amplifier 106. Timing elements resistor 96 and capacitor 98 are chosen to respond to fast changes in the order of ten milliseconds and the corresponding voltage level is applied over line 108 to the negative input of the amplifier 106. The amplifier 106 is a voltage comparator that produces a low level output when the input voltage level on line 108 is positive with respect to the voltage appearing on line 104 and produces a high level output when the voltage level appearing on line 108 is negative with respect to the voltage level appearing on line 104.

A voltage divider comprising resistors 96 and 100 will establish a quiescent level at the negative input of the voltage comparator 106 which will be more positive than the voltage level appearing on line 104 as determined by the voltage divider comprising the resistors 110 and 112. This condition will cause the output of the voltage comparator 106 to be normally at a low signal level which will be maintained for slowly varying light change. When an object such as a finger is moved over the photodiode 95, the light striking the diode is decreased and the resulting voltage level appearing at the negative input of the voltage comparator 106 will become more negative. This action will cause the voltage level appearing on line 108 to become more negative than the slowly changing voltage level appearing on line 104, which will cause the output of the voltage comparator 106 to switch to a high level digital signal. This high level digital output of the voltage comparator 106 can be used as a logic signal to represent the presence or absence of an item over the scanner. This type of circuit operates in a photoconduction mode and allows automatic correction for slow changes in ambient light levels. The output signals of the photodiodes 64 and 66 are transmitted over line 67 to the microprocessor 56.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes in modification of the invention that fall within the broad scope of the invention as defined by the appended claims.

We claim:

1. A checkout system for checking the price of a purchased merchandise item having a coded label located thereon which contains coded indicia representing the identity of the merchandise item comprising:

a checkout counter having a supporting surface including a transparent portion over which the coded label of the purchased merchandise item is moved;

scanning means mounted within said checkout counter adjacent the transparent portion including a light source operable for projecting scanning light beams through said transparent portion for scanning the coded label, said scanning means generating data signals in response to the scanning of said coded label;

processing means connected to said scanning means for generating the price of the merchandise items scanned in response to the generation of said data signals;

said checkout counter including first and second aperture portions positioned adjacent to one side of said transparent portion; and first and second photodetector means mounted in the surface of said checkout counter which are sensitive to ambient light and coupled to said processing means, said first photodetector means being mounted to receive ambient light in a generally vertical direction in said first aperture portion and enabled to generate an electrical enable signal in response to not receiving said ambient light and said second photodetector means being mounted to receive ambient light in a generally vertical direction in said second aperture portion for generating an electrical control signal in response to receiving sequentially said ambient light after not receiving the ambient light, said enable and control signals being transmitted to said processing means whereby said processing means will repeat the price of the previously processed merchandise item each time the processing means simultaneously receives said enable and control electrical signals.

2. The scanning system of claim 1 in which the enable signal is generated by said first photodetector means in response to the placing of a finger over the first aperture portion after the merchandise item has been scanned.

3. The scanning system of claim 2 in which the control signal is generated by said second photodetector means in response to the sequential placing of a finger over the second aperture portion and the removal of the finger from the second aperture portion.

4. A method for repeating the price of a merchandise item in a checkout system which includes an optical bar code system mounted in a checkout counter and first and second photodetector means exposed to ambient light comprising the steps of:

scanning the coded label of a first purchased merchandise item;

generating data representing the identification of the purchased merchandise item;

addressing a price look-up table to retrieve the price of the purchased merchandise item using the generated data as the address;

locating first and second apertures adjacent to each other in the surface of the checkout counter;

mounting a first photodetector means in said first aperture which is exposed to receive ambient light in a generally vertical direction from above the checkout counter;

covering the first aperture with a finger to disable the first photodetector means to generate a first control signal after a coded label has been scanned;

mounting a second photodetector means in said second aperture which is exposed to receive ambient light in a generally vertical direction from above the checkout counter;

alternatively covering and uncovering the second aperture with a finger to enable the second photodetector means to intermittently receive the energy of the ambient light to generate a second control signal in response to processing a second purchased merchandise item having the same price as the first merchandise item; and repeating the price of the first merchandise item as the price of the second merchandise item in response to the simultaneous generation of the first and second control signals.

* * * * *